United States Patent
Zafarana

(10) Patent No.: US 10,658,937 B1
(45) Date of Patent: May 19, 2020

(54) CONTROLLER FOR CLOSED LOOP CONTROL OF A DCX CONVERTER AND METHOD THEREFOR

(71) Applicant: SEMICONDUCTOR COMPONENTS INDUSTRIES, LLC, Phoenix, AZ (US)

(72) Inventor: Alessandro Zafarana, Milan (IT)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/515,389

(22) Filed: Jul. 18, 2019

Related U.S. Application Data

(60) Provisional application No. 62/817,390, filed on Mar. 12, 2019.

(51) Int. Cl.
*H02M 3/335* (2006.01)
*H02M 1/08* (2006.01)
(Continued)

(52) U.S. Cl.
CPC ....... *H02M 3/33592* (2013.01); *H02M 1/083* (2013.01); *H02M 1/38* (2013.01);
(Continued)

(58) Field of Classification Search
CPC ............. H02M 2001/385; H02M 1/38; H02M 3/33592; H02M 3/33569; H02M 2001/0058
See application file for complete search history.

(56) References Cited

U.S. PATENT DOCUMENTS

| 2005/0180178 A1* | 8/2005 | Yang ................. H02M 3/33569 363/21.06 |
| 2011/0103097 A1* | 5/2011 | Wang ................ H02M 3/33592 363/17 |

(Continued)

OTHER PUBLICATIONS

Pulsewidth Locked Loop (PWLL) for Automatic Resonant Frequency Tracking in LLC DC-DC Transformer (LLC-DCX), Weiyi Feng, Student Member, IEEE, Paolo Mattavelli, Member, IEEE, and Fred C. Lee, Fellow, IEEE, IEEE Transactions on Power Electronics, vol. 28, No. 4, Apr. 2013.

(Continued)

*Primary Examiner* — Harry R Behm
(74) *Attorney, Agent, or Firm* — Polansky & Associates, P.L.L.C.; Paul J. Polansky

(57) ABSTRACT

A controller for a DCX power converter includes an SR controller that controls conduction times of first and second SR transistors in response to respective conduction conditions thereof, and a primary side controller that provides first and second primary phase signals controlling first and second transistors, measures a first sense signal as a time between a gate voltage of the first SR transistor falling below a first threshold and an activation of the second primary phase signal, an adaptive dead time proportional to an average of current conducted in the SR transistors during their respective active times, a first reference signal as a predetermined delay time plus the adaptive dead time, and a first error signal as an average difference between the first sense signal and the first reference signal, and controls a switching speed of the first and second primary phase signals to reduce the first error signal.

20 Claims, 6 Drawing Sheets

(51) Int. Cl.
*H02M 1/00* (2006.01)
*H02M 1/38* (2007.01)
(52) U.S. Cl.
CPC .............................. *H02M 3/33569* (2013.01);
*H02M 2001/0009* (2013.01); *H02M 2001/0058* (2013.01)

(56) References Cited

U.S. PATENT DOCUMENTS

| | | | | |
|---|---|---|---|---|
| 2011/0149607 A1* | 6/2011 | Jungreis | .............. | H02M 3/3376 363/21.02 |
| 2013/0063985 A1* | 3/2013 | Ye | ............................ | H02M 1/38 363/21.05 |
| 2014/0241018 A1* | 8/2014 | Hwang | ............... | H02M 3/3376 363/53 |
| 2016/0062428 A1* | 3/2016 | Zeng | .......................... | G06F 1/20 713/300 |
| 2017/0025961 A1* | 1/2017 | Seeman | ................... | H02M 1/08 |
| 2018/0262116 A1 | 9/2018 | Ouyang | | |

OTHER PUBLICATIONS

FAN6248 "Advanced Synchronous Rectifier Controller for LLC Resonant Converter"; Data Sheet; Apr. 2017; Rev 1.0; Semiconductor Components Industries, LLC; 5005 E. McDowell Road, MD A700; Phoenix, AZ; 85008; United States; 16 pages.

Rohan Samsi, Quian Ouyang and Jinghai Zhou; "Increasing the Power Density and Efficacy of Datacenters Using a Two-Stage Solution for 48V Power Distribution"; Data Sheet; Mar. 2017; Monolithic Power Systems, Inc.; 79 Great Oaks Blvd; San Jose, CA; 95119; United States; 20 pages.

NCP4304A, NCP4304B; "Secondary Side Synchronous Rectification Driver for High Efficiency SMPS Topologies"; Data Sheet; Sep. 2012; Rev. 0; Semiconductor Components Industries, LLC; 5005 E. McDowell Road, MD A700; Phoenix, AZ; 85008; United States; 32 pages.

SRK2001; "Adaptive synchronous rectification controller for LLC resonant converter"; Data Sheet; May 2015; DocID027367 Rev. 3; STMicroelectronics; 2525 Augustine Dr; Santa Clara, CA; 95054; United States; 22 pages.

UCC24624; "Dual-Channel Synchronous Rectifier Controller for LLC Resonant Converters"; Data Sheet; Jul. 2018; Revised Nov. 2018; Texas Instruments; Post Office Box 655303; Dallas, Texas ; 75265; United States; 38 pages.

Amin Bemat, Quian Ouyang, Rohan Samsi and Jinghai Zhou; "2-Stage Solution for Datacenters"; Data Sheet; APEC 2018; Monolithic Power Systems, Inc.; 79 Great Oaks Blvd; San Jose, CA; 95119; United States; 20 pages.

* cited by examiner

US 10,658,937 B1

CONTROLLER FOR CLOSED LOOP CONTROL OF A DCX CONVERTER AND METHOD THEREFOR

CROSS-REFERENCE TO RELATED APPLICATIONS

This application claims the benefit of U.S. Provisional Patent Application No. 62/817,390, filed on Mar. 12, 2019, the entire contents of which is incorporated herein by reference.

FIELD OF THE DISCLOSURE

The present disclosure relates generally to power conversion circuits, and more particularly to unregulated DC-DC (DCX) converters.

BACKGROUND

Direct current-to-direct current (DC-DC) converters are used to provide output voltages in a variety of power supply applications. For example, in servers used for cloud computing, the DC-DC converter may be used in an open loop configuration without output regulation. This converter type, known as a "DCX converter", can receive a relatively large input voltage, for example a voltage between 40 and 60 volts (V), and provide a lower voltage suitable for second-stage, point-of-load (POL) regulators. The DCX converter stage focuses on efficiency to set its output voltage $V_{OUT}$ within a limited range. For example, the DCX stage can reduce the input voltage by a ratio of 10:1 to provide $V_{OUT}$ within a range of 3.6V-6.5V and provide sustained power generally in the range 250 watts (W)-500 W. Each POL regulator is robust enough to regulate the reduced, unregulated input voltage accurately to a suitable voltage for the electronic circuitry it powers.

The DCX converter needs to maintain high efficiency regardless of variations in values of the resonant components used in the converter and the parasitics of the board layout. A typical DCX converter uses a resonant network on the primary side of the transformer to achieve zero voltage switching (ZVS) on the primary side and ZVS as well as zero current switching (ZCS) in the secondary side. To achieve a high voltage reduction ratio, the DCX converter uses a transformer to set the output based on the windings ratio but does not require electrical isolation between the primary- and secondary-side circuits. In general, to achieve high efficiency, the switching frequency of the transistors in the primary side should be approximately equal to the resonance frequency of the reactive elements on the primary side. The transformer is typically operated at relatively high frequency, for example a frequency greater than 700 KHz, and is distributed across the printed circuit board (PCB) to reduce its size. At these relatively high frequencies, it is difficult to maintain efficiency when the layout parasitic inductances can vary significantly while delivering high current through the secondary windings. Moreover, the synchronous rectifier (SR) transistor driver must work autonomously to turn on and turn off the SR transistors to rectify the SR transistors despite the variable parasitic inductances of the SR transistors.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
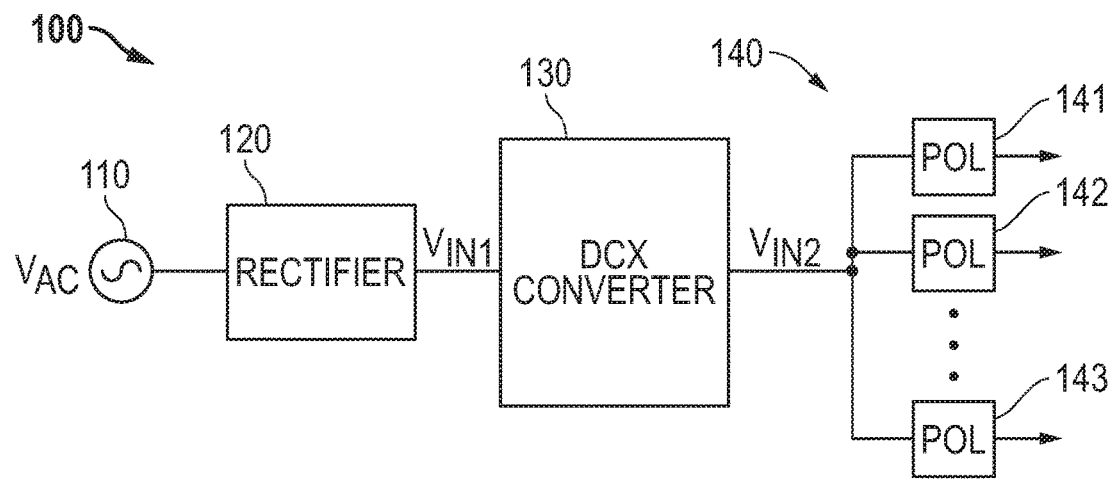
FIG. 1 illustrates in block diagram form a power supply system for a computer.

FIG. 1 illustrates in block diagram form a power supply system 100 for a computer. Power supply system 100 includes a voltage source 110, a rectifier 120, a DC-DC converter 130 labeled "DCX converter", and a set of point-of-load (POL) regulators 140. Voltage source 110 provides an alternating current (AC) input voltage labeled "$V_{AC}$", such as an AC mains supply. Rectifier 120 has an input connected to the output of voltage source 110, and an output for providing an input voltage labeled "$V_{IN1}$". DC-DC converter 130 has an input connected to the output of rectifier 120, and an output for providing a reduced voltage labeled "$V_{IN2}$". POL regulators 140 include exemplary POL regulators 141, 142, and 143, each having an input for receiving "$V_{IN2}$", and an output for providing a regulated voltage to a portion of the circuitry in the server, not shown in FIG. 1.

In operation, power supply system 100 has an architecture that is well-suited to the server environment. Rectifier 120 provides the initial conditioning of $V_{AC}$ by converting a sinusoidal AC signal into a half-wave rectified signal, i.e. a haversine. Rectifier 120 also includes a bulk capacitor to reduce the ripple in the haversine, and thus provides $V_{IN1}$ as a smoothed haversine. DC-DC converter 130 is an unregulated DC-DC converter, i.e. a DCX converter, and converts $V_{IN1}$ into an unregulated lower voltage $V_{IN2}$.

In particular, DC-DC converter 130 focuses on converting input voltage $V_{IN1}$, having a voltage such as approximately 40-60 V, to a lower voltage $V_{IN2}$, such as a voltage from 3.6-6.5 V, with high efficiency. To improve conversion efficiency, DC-DC converter 130 provides its output voltage near the desired voltage without using voltage feedback. Power supply system 100 implements DC-DC converter 130 as an LLC converter to achieve the goals of preserve conversion efficiency while providing a voltage in the desired range.

Each of POL regulators 140 changes $V_{IN2}$ into a regulated, generally lower voltage that is needed by the circuitry it supplies, such as 5.0 V, 3.3 V, 2.0 V, and the like. Each POL converter uses voltage feedback to regulate its output voltage to be close to its desired voltage, and can be implemented by, for example, a DC-DC switched mode power supply.

Figure 2:
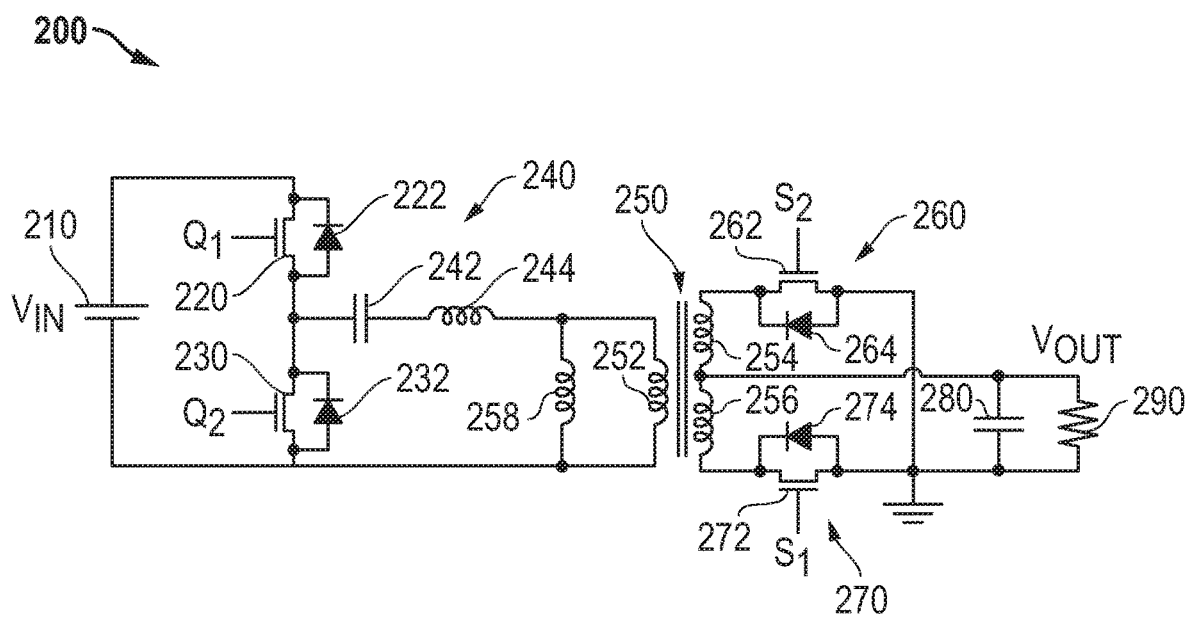
FIG. 2 illustrates in schematic form a DCX converter known in the prior art.

FIG. 2 illustrates in schematic form a DCX converter 200 known in the prior art. DCX converter 200 includes generally a DC power supply 210, a transistor 220, a transistor 230, a resonant network 240, a transformer 250, a first synchronous rectifier (SR) transistor 260, a second SR transistor 270, an output capacitor 280, and a resistor 290. DC supply 210 has a positive terminal, and a negative terminal connected to ground, and provides a DC voltage VIN referenced between its positive and negative terminals. Transistor 220 is an N-channel metal-oxide-semiconductor (MOS) power transistor having a drain connected the positive terminal of DC power supply 210, a gate for receiving signal labeled "G2", and a source, and having an associated body diode 222 with an anode connected to the source of transistor 230, and a cathode connected to the drain of transistor 220. Transistor 230 is an N-channel MOS power transistor having a drain connected the source of transistor 220, a gate for receiving signal labeled "G2", and a source connected to the second terminal of DC supply 21, and having an associated body diode 232 with an anode connected to the source of Transistor 230, and a cathode connected to the drain of transistor 230.

Resonant network 240 includes a capacitor 242, and an inductor 244. Capacitor 242 has a first terminal connected to the drain of transistor 220 and the source of transistor 230, and a second terminal. Inductor 244 has a first terminal connected to the second terminal of capacitor 242, and a second terminal.

Transformer 250 has a primary winding 252, a first secondary winding 254, a second secondary winding 256, and a magnetizing inductance 268. Primary winding 252 has a first end connected to the second terminal of capacitor 242, and a second end. First secondary winding 254 has a first end, and a second end connected to a center tap of transformer 250 that provides an output voltage labeled "$V_{OUT}$" that is the output voltage of LLC converter 200, and a second end. Second secondary winding 256 has a first end, and a second end connected to a center tap of transformer 250, and a second end. Magnetizing inductance 258 has a first terminal connected to the first end of primary winding 252, and a second end connected to the second end of primary winding 252.

First SR transistor 262 is an N-channel MOS power transistor having a first source/drain terminal connected to the first end of first secondary winding 252 a gate for receiving a signal labeled "S2", and a second source/drain terminal connected to ground, and having an associated body diode 264 with an anode connected to the second source/drain terminal thereof, and a cathode connected to the first source/drain terminal thereof. Second SR transistor 272 is an N-channel MOS power transistor having a first source/drain terminal connected to the second end of second secondary winding 252 a gate for receiving a signal labeled "S1", and a second source/drain terminal connected to ground, and having an associated body diode 274 with an anode connected to the second source/drain terminal thereof, and a cathode connected to the first source/drain terminal thereof.

Capacitor 280 has a first terminal connected to the center tap of transformer 250, and a second terminal connected to ground. Resistor 290 has a first terminal connected to the center tap of transformer 250, and a second terminal connected to ground.

In operation, DCX converter 200 is a half-bridge, open-loop resonant LLC converter that provides high conversion efficiency. A controller (not shown in FIG. 2) switches SR transistors 260 and 270 to achieve synchronous rectification with zero current switching.

DCX converter 200 forms $V_{OUT}$ at a voltage determined mostly by the turns ratio of transformer 250. It switches transistors 220 and 230 at a switching frequency approximately equal to the resonance frequency. Mathematically, efficiency is maximized if $f_{SW}=f_{RES}$, in which $f_{SW}$ is the switching frequency of transistors 220 and 230 on the primary side of transformer 250, and $f_{RES}$ is the resonance frequency, determined by the inductance values of the series inductor (inductor 244) and the magnetizing inductance of transformer 250 (inductor 258), and the capacitance of capacitor 242.

In practice, $f_{SW}$ will differ from $f_{RES}$ due to tolerances in the components. For example, to achieve high-frequency operation, transformer 250 may be distributed across the printed circuit board, which makes it difficult to track parasitic inductances. Moreover, other factors contribute to the inability to determine $f_{RES}$, including aging of capacitor 242, temperature drift, capacitor bias derating, manufacturing tolerances, non-linear inductance as load current varies, and manufacturing tolerance of the switching frequency. As $f_{SW}$ deviates from the actual $f_{RES}$, conversion efficiency drops.

To adapt the switching frequency of an open-loop LLC resonant converter to actual values, Feng et al. in an article entitled "Pulsewidth Locked Loop (PWLL) for Automatic Resonant Frequency Tracking in LLC DC-DC Transformer (LLC-DCX)," IEEE Transactions on Power Electronics, vol. 28, no. 4, April 2013, pages 1862-1869 propose a converter that uses the secondary side zero current sensing to track the actual resonant frequency and to adjust the primary-side switching frequency to the frequency so measured.

However, Feng does not address several additional challenges. First, the measurement of the SR turn-on time is imprecise due to the parasitic inductances of the SR transistors, tolerances in the component values, and the like. Second, the turn-on voltage that can be used to adapt the switching frequency is a relatively small voltage that must be detected in a noisy environment created by the switching of high-power transistors. Third, the switching times of the two SR transistors may be different from each other, causing difficulty in determining the resonance frequency. Fourth, the inability to precisely determine the resonance frequency may cause the primary side transistors to fail to achieve zero voltage switching, decreasing the efficiency. Fifth, because of the low-voltage sensing of turn-off conditions, the SR controllers usually implement minimum programmable durations for on-time and off-time, causing difficulty in measuring the resonance frequency. Sixth, during no-load conditions, the primary side sees an infinite load resistance since no current is delivered to the secondary side, keeping the SR transistors non-conductive and reducing the frequency well below the resonance frequency. In this condition, the LLC converter will operate in capacitor mode and the output voltage will rise above the turns ratio, potentially putting it at above an acceptable $V_{OUT}$ limit.

A DCX converter that provides adaptive resonance frequency tracking while addressing these problems will now be described.

Figure 3:
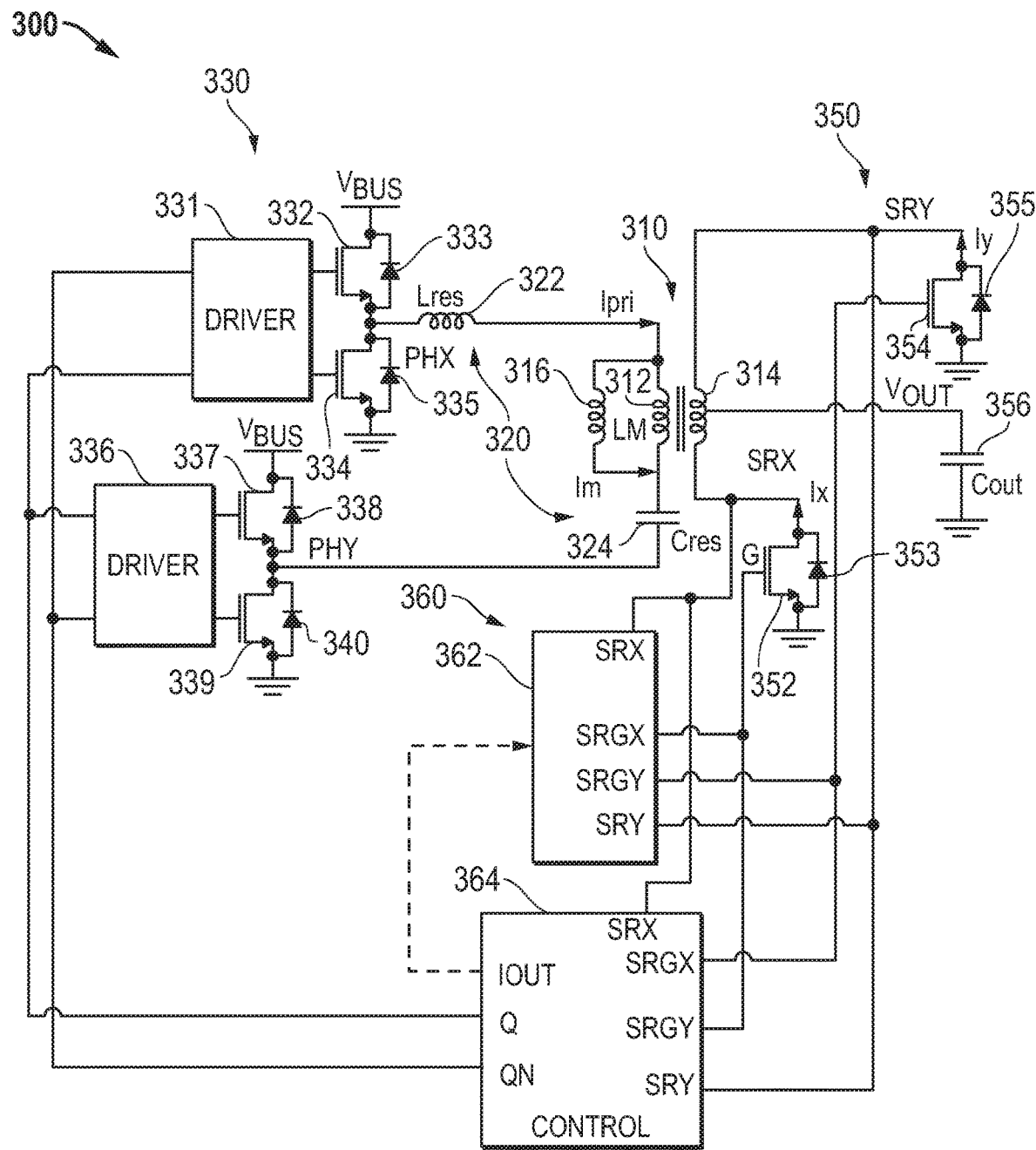
FIG. 3 illustrates in partial block diagram and partial schematic form an embodiment of a DCX converter according to the present disclosure.

FIG. 3 illustrates in partial block diagram and partial schematic form an embodiment of a DCX converter 300 according to the present disclosure. DCX converter 300 includes generally a transformer 310, a resonant network 320, a primary-side driver 330, an output stage 350, and a controller 360.

Transformer 310 has a primary winding 312, a secondary winding 314, and a magnetizing inductance 316. Primary winding 312 has a first end and a second end. Secondary winding 314 has a first end, a center tap, and a second end. Magnetizing inductance 316 has a first terminal connected to the first end of primary winding 312, and a second terminal connected to the second end of primary winding 312, and has an associated inductance labeled "Lm"

Resonant network 320 includes an inductor 322 and a capacitor 324. Inductor 322 has a first terminal, and a second terminal connected to the second end of primary winding 312, and has an associated inductance labeled "Lm". Capacitor 324 has a first terminal connected to the second end of primary winding 312, and a second terminal, and has an associated capacitance labeled "Cres".

Primary-side driver 330 includes a driver 331, a transistor 332, a body diode 333, a transistor 334, a body diode 335, a driver 336, a transistor 337, a body diode 338, a transistor 339, a body diode 340. Driver 331 has a first input for receiving a signal labeled "QN", a second input for receiving a signal labeled "Q", and first and second outputs. Transistor 332 is an N-channel power MOS transistor having a drain for receiving an input voltage labeled "$V_{BUS}$", a gate connected to the first output of driver 331, and a source connected to the first end of primary winding 312. Body diode 333 has an anode connected to the source of transistor 332, and a cathode connected to the drain of transistor 332. Transistor 334 is an N-channel power MOS transistor having a drain connected to the source of transistor 332, a gate connected to the second output of driver 331, and a source connected to ground. Body diode 336 has an anode connected to the source of transistor 334, and a cathode connected to the drain of transistor 334. Driver 336 has a first input for receiving signal Q, a second input for receiving signal QN, and first and second outputs. Transistor 337 is an N-channel power MOS transistor having a drain for receiving input voltage $V_{BUS}$, a gate connected to the first output of driver 336, and a source connected to the second terminal of capacitor 324. Body diode 338 has an anode connected to the source of transistor 337, and a cathode connected to the drain of transistor 337. Transistor 339 is an N-channel power MOS transistor having a drain connected to the source of transistor 337, a gate connected to the second output of driver 336, and a source connected to ground. Body diode 340 has an anode connected to the source of transistor 337, and a cathode connected to the drain of transistor 337.

Output stage 350 includes an SR transistor 352, an SR transistor 355, and a capacitor 356. SR transistor 352 is an N-channel power MOS transistor having a drain connected to the second end of secondary winding 314 having a voltage labeled "SRX" thereon, a gate for receiving a signal labeled "SRGX", and a source connected to ground. Body diode 353 has an anode connected to the source of SR transistor 352, and a cathode connected to the drain of SR transistor 352. SR transistor 354 is an N-channel MOS transistor having a drain connected to the first end of secondary winding 314 having a voltage labeled "SRY" thereon, a gate for receiving a signal labeled "SRGX", and a source connected to ground. Body diode 355 has an anode connected to the source of SR transistor 354, and a cathode connected to the drain of SR transistor 354. Capacitor 356 has a first terminal connected to the center tap of secondary winding 314, and a second terminal connected to ground.

Controller 360 includes an SR controller 362 and a primary side controller 364. SR controller 362 has an input connected to the drain of SR transistor 352, an input connected to the drain of SR transistor 354, an optional input for receiving a current signal labeled "$I_{OUT}$", an output connected to the gate of SR transistor 352, and an output connected to the gate of transistor 354. Primary controller 364 has a first input connected to the drain of SR transistor 352 for receiving signal SRGX, a second input connected to the gate of SR transistor 352 for receiving signal SRX, a third input connected to the drain of SR transistor 354 for receiving signal SRY, a first input connected to the gate of SR transistor 352 for receiving signal SRGY, and outputs for providing signals Q and QN to drivers 331 and 336, and an optional output for providing signal IOUT.

In operation, DCX converter 300 is a full-bridge, open-loop resonant LLC converter that provides high conversion efficiency. SR controller 362 switches SR transistors 352 and 354 to achieve zero current switching. SR controller 362 activates each SR transistor when its drain voltage falls below a negative threshold, and de-activates each SR transistor when its drain current falls below a zero-current threshold. It can measure the drain current using any of a variety of known current sensing techniques, including measuring the voltage across a shunt resistor, measuring the drain-to-source voltage ($V_{DS}$) and comparing the $V_{DS}$ to a threshold, and detecting the on-time of the transistor's body-drain diode. In the illustrated embodiment, SR controller 362 measures the current flowing through each of each of SR transistors 352 and 354 by measuring $V_{DS}$, which is related to the current based on the ON resistance of the SR transistor. SR controller 362 compares the measured $V_{DS}$ to a threshold to determine when the current has dropped to zero to make the respective transistor non-conductive. However, it should be apparent that SR controller 362 uses just one of several possible current sensing techniques.

DCX converter 300 forms $V_{OUT}$ at a voltage determined mostly by the turns ratio of transformer 310. It switches transistors 332, 334, 342, and 344 at a switching frequency approximately equal to the resonance frequency but adapts the actual switching frequency to track the resonance frequency. To increase efficiency, DCX converter 300 causes $f_{SW}$ to track $f_{RES}$ using closed loop control. A higher $f_{SW}$ increases diode losses at the primary and secondary sides of transformer 310, whereas a lower $f_{SW}$ increases root-mean-squared (RMS) conduction losses, as described by Feng et al. As $f_{SW}$ differs from $f_{RES}$, $V_{OUT}$ changes from its target (e.g., $V_{BUS}/10$) because $f_{SW}$ is changing. Thus, DCX converter 300 preferably uses inductors having a very small Q to cause the $V_{OUT}/V_{BUS}$ ratio to be flat around the point in which the frequency ratio fn=1, wherein fn=$f_{SW}/f_{RES}$. Since the gain is flat, DCX converter 300 cannot use $f_{SW}$ to regulate $V_{OUT}$. To achieve flat gain the transformer has a high inductance ratio $K_L$, wherein $K_L$ is the ratio of the $K_L$=Lm/Lres. Since the turns ratio is large and since $K_L$ is at least 100, Lm must also be very large. The large Lm makes the magnetizing current Im very small, ZVS at the primary side will not be possible, and voltage spikes at the primary side will also occur.

For this reason, DCX converter 300 truncates (in the manner used in the control loop described below) the SR current earlier within the dead time as determined the control loop, which allows enough current at the primary side to achieve ZVS.

To avoid excessive losses at the secondary side caused by anticipating the turn-off of the SR transistors, DCX converter 300 modulates the dead time according to the size of the load, in which a heavier load causes higher current when the SR transistor turns off to decrease dead time, and a lighter load causes lower current when the SR transistor turns off to increase dead time. To estimate the size of the load, DCX converter 300 samples and holds the SR transistor drain-to-source voltage ($V_{DS}$) when the first derivative of $V_{DS}$ is about zero, which occurs in the middle of the switching half period. This technique permits DCX converter 300 to have a load current estimation that is not sensitive to the parasitic inductance of the SR transistors and the PCB layout.

In particular, primary side controller 364 measures a first sense signal as a time between a gate voltage of SR transistor 352 falling below a first threshold and an activation of signal QN; an adaptive dead time proportional to an average of current conducted in SR transistors 352 and 354 during their respective active times; a first reference signal as a predetermined delay time plus the adaptive dead time; and a first error signal as an average difference between the first sense signal and the first reference signal. Primary side controller 364 controls a switching speed of the Q and QN signals to reduce the first error signal. In this way, primary side controller 364 mitigates each of the problems associated with the known adaptive technique outlined above as described in greater detail below.

Figure 4:
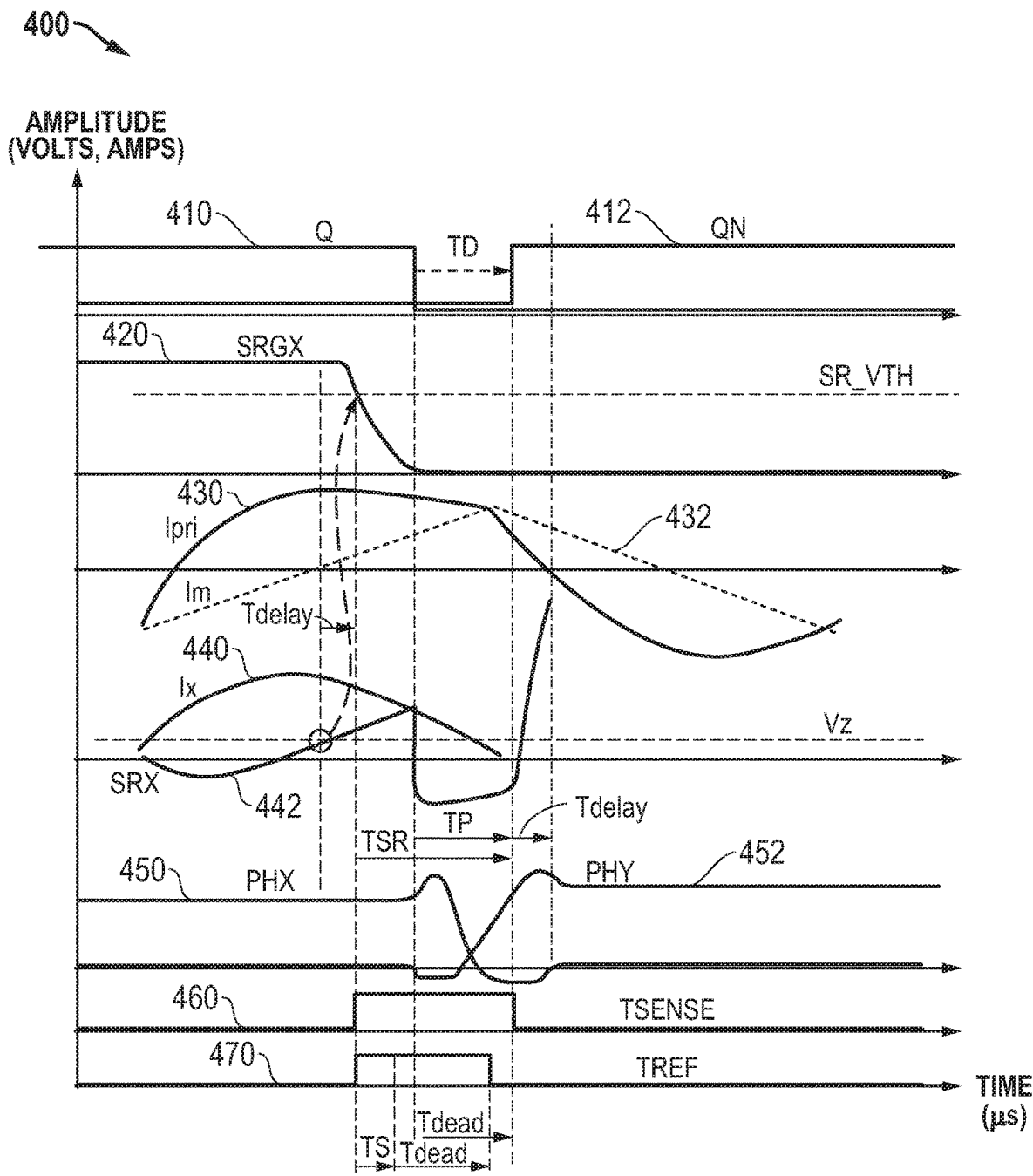
FIG. 4 illustrates a timing diagram showing signals useful in understanding the operation of the DCX converter of FIG. 3.

FIG. 4 illustrates a timing diagram 400 showing signals useful in understanding the operation of DCX converter 300 of FIG. 3. In timing diagram 400, the horizontal axes represent time in microseconds, and the vertical axis represents the magnitude of various signals in volts or amperes (amps) as the case may be. Timing diagram 400 includes a waveform 410 of the Q signal and a waveform 412 of the QN signal in volts, a waveform 420 of the SRGX signal, a waveform 430 of the primary current labeled "Ipri" in amperes, a waveform 432 of the magnetizing current labeled "Im" in amps, a waveform 440 of the current though SR transistor 352 in amps, a waveform 442 of the drain voltage of SR transistor 352 in volts, a waveform 450 of the current through first SR transistor 352 in amps, a waveform 452 of the current through first SR transistor 352 in amps, a waveform of a sense time signal labeled "TSENSE" in volts, and a waveform 460 of a reference signal labeled "TREF" in volts. Timing diagram 400 also shows a threshold voltage labeled "SR_VTH" associated with waveform 420, and a zero-voltage labeled "Vz" associated with waveform 442.

The operation shown in FIG. 4 begins with signal Q high (transistors 334 and 337 conductive) and QN low (transistors 332 and 339 non-conductive). Signal PHX is high and signal PHY is low. This bias condition presents a positive voltage across resonant network 320 and the primary winding of transformer 310. Signal SRGX is high, causing SR transistor 352 to be conductive. SRX, the drain voltage on SR transistor 352, initially falls, representing a higher negative drain current Ix, until peaking and starting to fall. At some point signal SRX rises above the zero-voltage threshold Vz. SR controller 362 senses the SRX signal crossing Vz, and de-activates signal SRGX. A delay time labeled "Tdelay" afterward, SRGX falls below threshold SR_VTH. By deactivating SRGX, SR controller 362 makes SR transistor 352 non-conductive to prevent current from reversing direction. Drain voltage SRX continues to rise until the Q signal goes low. At that point, the drain voltage SRX drops rapidly, but is clamped by diode 353. Shortly after Q signal goes low, signal PHX falls and signal PHY rises.

The time between the falling edge of the Q signal and the rising edge of the QN signal represents an actual dead-time labeled "TD". When the Q signal decreases, SRGX remains low. SRX initially falls before increasing gradually because of the current conducted through diode 353. When the QN signal rises, SRGX remains low (keeping SR transistor 352 non-conductive while diode 353 is reverse biased), and SRX rises abruptly. During this period signal PHY starts to go high and signal PHX starts to go low.

Subsequently, the QN signal goes high. When the QN signal goes high, signal SRGX remains low, and drain voltage SRX increases rapidly. As PHY goes high and PHX goes low, primary current Ipri decreases at an increased rate, and magnetizing current Im starts to decrease.

Primary side controller 364 measures a first sense signal according to a time between a gate voltage of SR transistor 352 falling below a first threshold and an activation of the QN signal. As shown in FIG. 4, TSENSE is active between the time when SRGX falls below SR_VTH and the time QN goes high, and primary side controller 364 forms a voltage proportional to the time that TSENSE is high and uses it to control the primary switching frequency.

Primary side controller 364 measures an adaptive dead time, Tdead, proportional to an average of current conducted in SR transistors 352 and 354 during their respective active times. Thus Tdead scales with the size of the load.

Primary side controller 364 measures a reference signal according to a predetermined delay time labeled "TS" plus Tdead, and provides TREF at a high level for this duration starting at the time SRGC falls below SR_VTH. Tdead is a common-mode component between TSENSE and TREF.

Primary side controller 364 forms an error signal as an average difference between TSENSE and TREF, thus proportional to the length of time TSENSE is active beyond the de-activation of TREF. The control loop operates to change the frequency of the primary side switching, i.e. the switching speed of the Q and QN signals, to reduce the difference between TSENSE and TREF but according to an average of this difference. Since the difference is averaged over time, it does not result in false switching because of noise.

Figure 5:
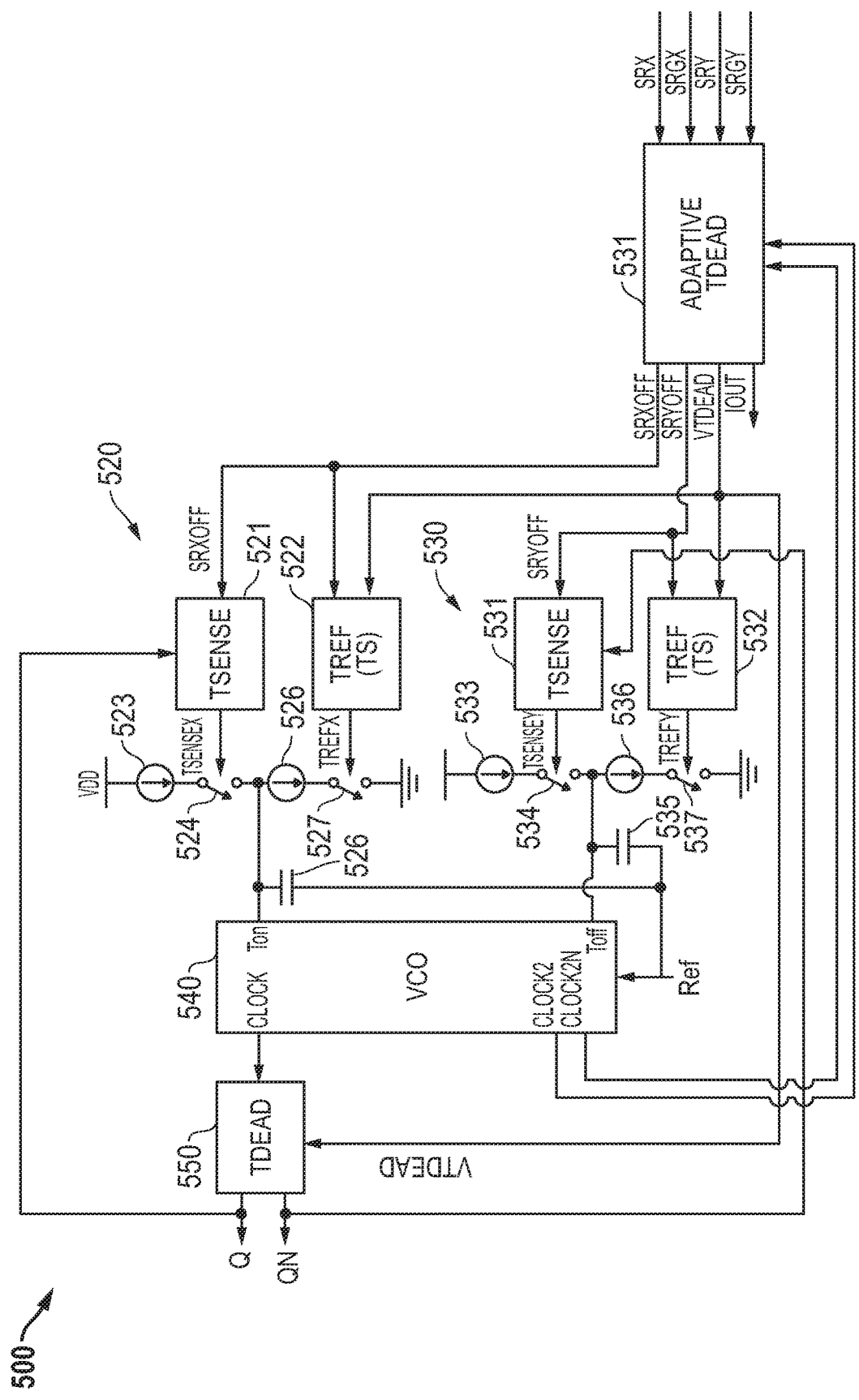
FIG. 5 illustrates in partial block diagram and partial schematic form a primary controller that can be used as the primary controller of FIG. 3.

FIG. 5 illustrates in partial block diagram and partial schematic form a primary controller 500 that can be used as primary side controller 364 of FIG. 3. Primary controller 500 includes generally an adaptive dead-time circuit 510, a phase measurement circuit 520, a phase measurement circuit 530, a voltage-controller oscillator (VCO) 540, and a dead-time insertion circuit 550.

Adaptive dead-time circuit 510 has inputs connected to output stage 350 for receiving the SRX, SRGX, SRY, and SRGY signals, inputs for receiving timing signals labeled "CLOCK2" and "CLOCK2N", and outputs for providing signals labeled "SRXOFF", "SRYOFF", "VTDEAD", and signal IOUT.

Phase measurement circuit 520 includes a sense time measurement circuit 521, a reference time measurement circuit 522, a current source 523, a switch 524, a capacitor 525, a current source 526, and a switch 527. Sense time measurement circuit 521 has a first input for receiving the SRXOFF signal from adaptive dead-time circuit 510, a second input for receiving the Q signal, and an output for providing a signal labeled "TSENSEX". Reference time measurement circuit 522 has a first input for receiving the SRXOFF signal from adaptive dead-time circuit 510, a second input for receiving the VTDEAD signal from adaptive dead-time circuit 510, and an output for providing a signal labeled "TREFX". Current source 523 has a first terminal connected to a power supply voltage terminal labeled "VDD", and a second terminal. Switch 524 has a first terminal connected to the second terminal of current source 523, a second terminal, and a control terminal connected to the output of sense time measurement circuit 521 for receiving the TSENSEX signal. Capacitor 525 has a first terminal connected to the second terminal of switch 524, and a second terminal connected to a reference terminal labeled "REF". Current source 526 has a first terminal connected to the first terminal of capacitor 525, and a second terminal. Switch 527 has a first terminal connected to the second terminal of current source 526, a second terminal connected to ground, and a control terminal connected to the output of reference time measurement circuit 522 for receiving the TREFX signal.

Phase measurement circuit 530 includes a sense time measurement circuit 531, a reference time measurement circuit 532, a current source 533, a switch 534, a capacitor 535, a current source 536, and a switch 537. Sense time measurement circuit 531 has a first input for receiving the SRYOFF signal from adaptive dead-time circuit 510, a second input for receiving the Q signal, and an output for providing a signal labeled "TSENSEY". Reference time determination circuit 532 has a first input for receiving the SRYOFF signal from adaptive dead-time circuit 510, a second input for receiving the VTDEAD signal from adaptive dead-time circuit 510, and an output for providing a signal labeled "TREFY". Current source 533 has a first terminal connected to power supply voltage terminal VDD, and a second terminal. Switch 534 has a first terminal connected to the second terminal of current source 533, a second terminal, and a control terminal connected to the output of sense time measurement circuit 531 for receiving the TSENSEY signal. Capacitor 535 has a first terminal connected to the second terminal of switch 534, and a second terminal connected to the reference terminal. Current source 536 has a first terminal connected to the first terminal of capacitor 535, and a second terminal. Switch 537 has a first terminal connected to the second terminal of current source 536, a second terminal connected to ground, and a control terminal connected to the output of reference time measurement circuit 532 for receiving the TREFY signal.

VCO 540 has a first input labeled "Ton" connected to the first terminal of capacitor 525, a second input labeled "Toff" connected to the first terminal of capacitor 535, a first output for providing a clock signal labeled "CLOCK", a second output for providing clock signal CLOCK2, and a third output for receiving clock signal CLOCK2N.

Dead-time insertion circuit 550 has a first input for receiving the CLOCK signal from VCO 540, a second input for receiving the VTDEAD signal from adaptive dead-time circuit 510, and outputs for providing the Q and QN signals.

In operation, primary controller 500 implements the control mechanism described above with respect to FIG. 4. Adaptive dead-time circuit 510 provides signal VTDEAD as a voltage that is proportional to a dead-time. Phase measurement circuit 520 measures a first sense signal—TSENSEX—in response to primary phase signal Q and a first deactivation signal SRXOFF. It provides a first reference signal—TREFX—in response to adaptive dead time signal VTDEAD and first deactivation signal SRXOFF. Phase measurement circuit 520 provides the first error signal to the Ton terminal of VCO 540 in response to an average different between TSENSEX and TREFX. It does so in particular by integrating TSENSEX and TREFX, in which a duration of TSENSEX increases the first error signal, and a duration of TREFX decreases the first error signal.

Similarly, phase measurement circuit 530 measures a second sense signal—TSENSEY—in response to primary phase signal QN and a first deactivation signal SRXOFF. It provides a first reference signal—TREFX—in response to adaptive dead time signal VTDEAD and first deactivation signal SRXOFF. Phase measurement circuit 530 provides the second error signal to the Toff terminal of VCO 540 in response to an average different between TSENSEX and TREFX. It does so in particular by integrating TSENSEY and TREFY, in which a duration of TSENSEY increases the second error signal, and a duration of TREFX decreases the second error signal.

VCO 540 forms a clock signal defined by an on-time ramp whose duration is proportional to Ton, and an off-time ramp whose duration is proportional to Toff. Thus VCO 540 changes the primary frequency in response to both phases such that primary controller takes into account differences in the characteristics of transistors 332, 334, 337, and 339. VCO 540 has two inputs, Ton and Toff, to close two independent loops to compensate for different parasitic inductances in each SR branch. In other embodiments in which the PCB layout is symmetric and the transistors are well matched and have approximately the same terminal inductances, then Ton will be approximately equal to Toff, and the VCO would only include one control loop. VCO 540 also provides signals CLOCK2 and its complement CLOCK2N at a frequency equal to twice the frequency of the CLOCK signal.

Dead-time insertion circuit 550 inserts a dead-time between the de-activation of the Q and QN signal and the activation of the QN and Q signals, respectively, in response to a value of VTDEAD. Dead-time insertion circuit 550 scales the dead-time according to the level of the output current.

Circuits that can be used for adaptive dead-time circuit 510, sense time measurement circuits 521 and 531, and reference time measurement circuits 522 and 532 will now be described.

Figure 6:
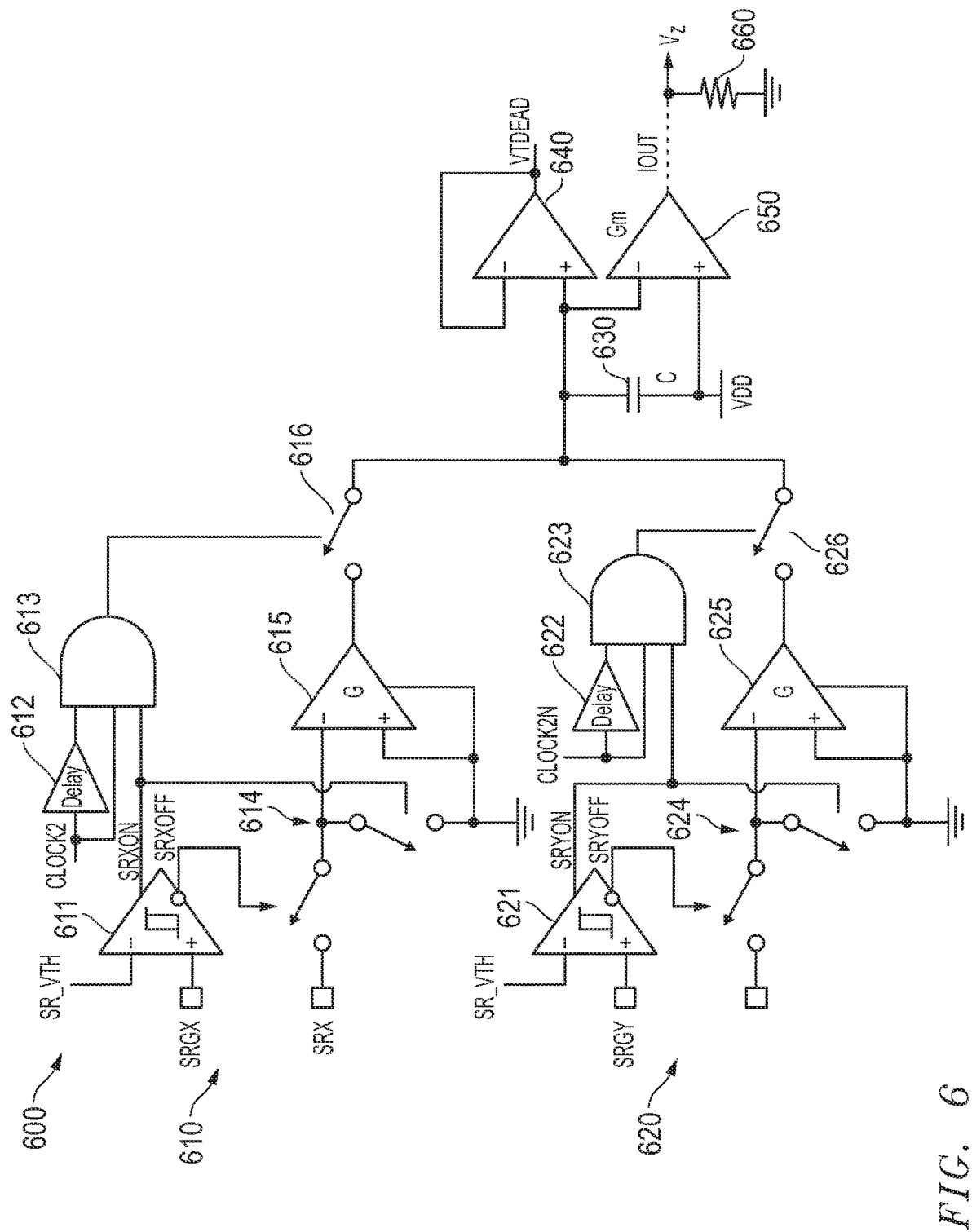
FIG. 6 illustrates in partial block diagram and partial schematic form an adaptive dead-time circuit 600 that can be used to implement adaptive dead-time circuit 510 of FIG. 5.

FIG. 6 illustrates in partial block diagram and partial schematic form an adaptive dead-time circuit 600 that can be used to implement adaptive dead-time circuit 510 of FIG. 5. Adaptive dead-time circuit 510 includes generally an X sample-and-hold circuit 610, a Y sample-and-hold circuit 620, a capacitor 630, a differential amplifier 640, a transconductance amplifier 650, and a resistor 660.

X sample-and-hold circuit 610 includes a hysteresis comparator 611, a delay element 612, an AND gate 613, a switch 614, an amplifier 615, and a switch 616. Amplifier 611 has a negative input for receiving the SR_VTH signal, a positive input for receiving the SRGX signal, a positive output for providing a signal labeled "SRXON", and a negative output for providing a signal labeled "SRXOFF". Delay element 612 has an input for receiving the CLOCK2 signal, and an output. AND gate 613 has a first input connected to the output of delay element 612, a second input for receiving the CLOCK2 signal, a third input connected the positive output of hysteresis comparator 611, and an output. Switch 614 is a double-pole, double-throw (DPDT) switch having a first terminal for receiving the SRX signal, a second terminal selectively connected to the first terminal thereof in response to the activation of the SRXOFF signal, a third terminal connected to the second terminal, and a fourth terminal connected to ground and selectively connected to the third terminal thereof in response to the activation of the SRXON signal. Amplifier 615 has a positive terminal connected to ground, a negative terminal connected to the second and third terminals of switch 614, and an output. Switch 616 is a single-pole, single-throw (SPST) switch having a first terminal connected to the output of amplifier 615, and a second terminal selectively connected to the first terminal in response to the activation of the output of AND gate 613.

Y sample-and-hold circuit 620 includes a hysteresis amplifier 621, a delay element 622, an AND gate 623, a switch 624, an amplifier 625, and a switch 626. Amplifier 621 has a negative input for receiving the SR_VTH signal, a positive input for receiving the SRGX signal, a positive output for providing a signal labeled "SRXON", and a negative output for providing a signal labeled "SRXOFF". Delay element 622 has an input for receiving the CLOCK2 signal, and an output. AND gate 623 has a first input connected to the output of delay element 622, a second input for receiving the CLOCK2 signal, a third input connected the positive output of hysteresis amplifier 621, and an output. Switch 624 is a double-pole, double-throw (DPDT) switch having a first terminal for receiving the SRX signal, a second terminal selectively connected to the first terminal thereof in response to the activation of the SRXOFF signal, a third terminal connected to the second terminal, and a fourth terminal connected to ground and selectively connected to the third terminal thereof in response to the activation of the SRXON signal. Amplifier 625 has a positive terminal connected to ground, a negative terminal connected to the second and third terminals of switch 624, and an output. Switch 626 is a single-pole, single-throw (SPST) switch having a first terminal connected to the output of amplifier 625, and a second terminal selectively connected to the first terminal in response to the activation of the output of AND gate 623.

Capacitor 630 has a first terminal connected to the second terminal of switch 616 and to the second terminal of switch 626, and a second terminal connected to a power supply voltage terminal labeled "VDD". VDD has a voltage that is positive with respect to ground. Amplifier 640 has a positive input terminal connected to the second terminal of switch 616 and to the second terminal of switch 626, a negative input terminal, and an output terminal connected to the negative input terminal thereof for providing the VTDEAD signal. Amplifier 650 has a positive input terminal connected to the second terminal of switch 616 and to the second terminal of switch 626, a negative input terminal connected to ground, and an output terminal for providing the IOUT signal.

In operation, X sample-and-hold circuit 610 and Y sample-and-hold circuit 620 sample the Ix and Iy currents into corresponding SR transistors 352 and 354, respectively. For example, in X sample-and-hold circuit 610, when SRGX is larger than SR_VTH plus a hysteretic amount, hysteresis comparator 611 activates signal SRXON at a high voltage and de-activates signal SRXOFF at a low voltage, causing switch 614 to close to provide SRX to the negative input of amplifier 615. When the CLOCK2 signal subsequently transitions from a low state to a high state approximately in the middle of the ON time, AND gate 613 activates its output to close switch 616 and sample the output of amplifier 615 on capacitor 630 for a duration set by the delay of delay element 612. When SRGX falls below SR_VTH minus a hysteretic amount, hysteresis comparator 611 activates signal SRXOFF at a high voltage and de-activates signal SRXON at a low voltage, keeping the output of AND gate low, opening switch 616, and grounding the negative input of amplifier 615. Y sample-and-hold circuit 620 operates in a corresponding fashion. Differential amplifier 640 is connected as a voltage follower to provide VTDEAD according to the voltage on the first terminal of capacitor 630 but without loading it. Transconductance amplifier 650 provides current IOUT proportional to the voltage on the first terminal of capacitor 630, which SR controller 362 can optionally convert into threshold voltage Vz using, for example, resistor 660 to ground.

Figure 7:
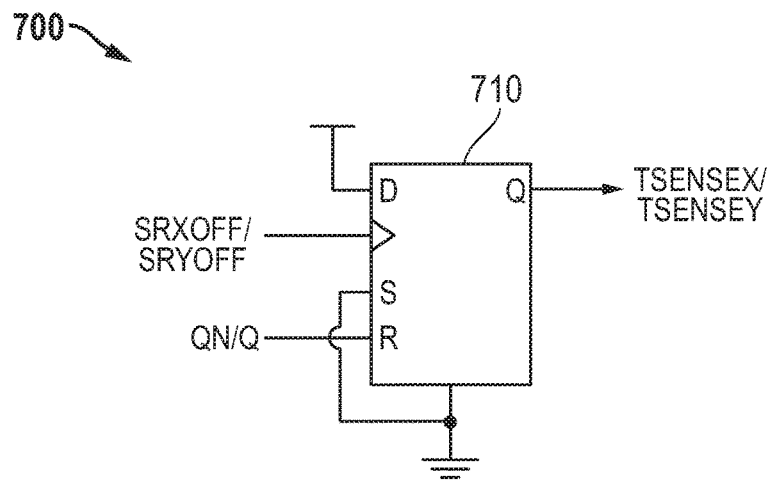
FIG. 7 illustrates in block diagram a sense time determination circuit that can be used to implement the sense time measurement circuits of FIG. 5.

FIG. 7 illustrates in block diagram form a sense time determination circuit 700 that can be used to implement sense time measurement circuits 521 and 531 of FIG. 5. Sense time determination circuit 700 is implemented with a latch 710 having a D input connected to a logic high voltage terminal, such as power supply voltage terminal VDD, a clock input for receiving one of the SRXOFF and SRYOFF signals as the case may be, a set input labeled "S" connected to ground, a reset terminal for receiving the QN signal or the Q signal as the case may be, and a Q output terminal for providing one of the TSENSEX and TSENSEY signals as the case may be. Latch 710 activates TSENSEX or TSENSEY, as the case may be, on the activation of the SRXOFF or SRYOFF signal and keeps it active until the opposite primary phase signal QN or Q is activated.

Figure 8:
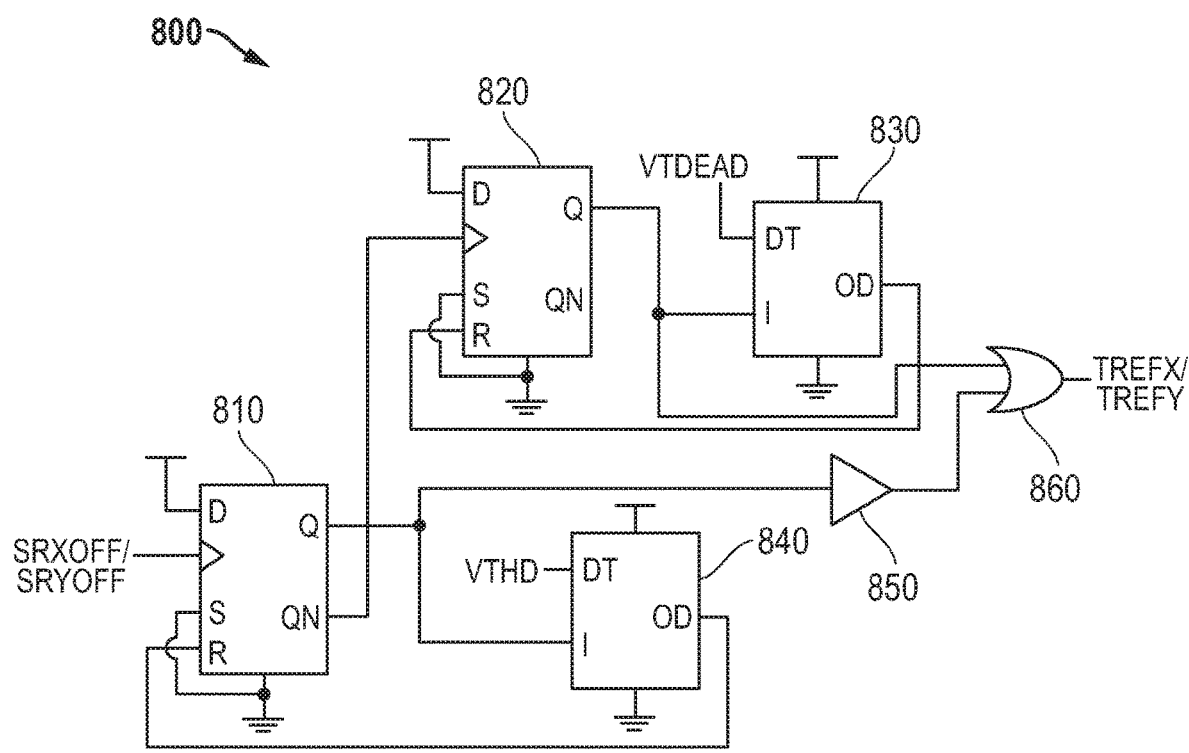
FIG. 8 illustrates in block diagram form a reference time determination circuit that can be used to implement the reference time determination circuits of FIG. 5.

FIG. 8 illustrates in block diagram form a reference time measurement circuit 800 that can be used to implement reference time measurement circuits 522 and 532 of FIG. 5. Reference time measurement circuit 800 includes a latch 810, a latch 820 a delay element 830, a delay element 840, an inverter 850, and an OR gate 860. Latch 810 has D input connected to the logic high voltage terminal, a clock input for receiving one of the SRXOFF and SRYOFF signals as the case may be, a set input S connected to ground, a reset input, and a Q output. Latch 820 has D input connected to the logic high voltage terminal, a clock input connected to the Q output of latch 810, a set input S connected to ground, a reset input, and a Q output. Delay element 830 has an input labeled "I" connected to the Q output of latch 820, a delay time input labeled "DT" for receiving the VTDEAD signal, and a delay output labeled "OD" connected to the R input of latch 820. Delay element 840 has an I input connected to the Q output of latch 810, a DT input for receiving a signal labeled "VTHD", and an OD output connected to the R input of latch 810. Inverter 850 has an input connected to the Q output of latch 810, and an output. OR gate 860 has a first input connected to the Q output of latch 820, a second input connected to the output of inverter 850, and an output for providing one of the TREFX and TREFY signals as the case may be.

In operation, latch 810 latches the logic high value on the D input when adaptive dead-time circuit 510 activates SRXOFF or SRYOFF, as the case may be. Latch 810 activates its Q output and de-activates its QN output. Delay element 840 provides its OD output by delaying the Q output of latch 810 by an amount of time based on a fixed time value VTHD. VTHD is a voltage that sets a delay time equal to TS as shown in FIG. 4. In one example, an analog voltage on a terminal of primary side controller 364 can be used to receive VTHD. The activation of the OD output of delay element 840 resets latch 810, causing latch 810 to deactivate its Q output and activate its QN output. The activation of the QN output of latch 810 causes latch 820 to latch the logic high value on the D input and activate the Q output. Delay element 830 provides its OD output by delaying the Q output of latch 820 by an amount of time based on adaptive delay time value VTDEAD. The activation of the OD output of delay element 830 resets latch 820, causing latch 810 to deactivate its Q output. OR gate 860 actives TREFX or TREFY, as the case may be, from the activation of the SRXOFF or SRYOFF signal by merging a fixed time duration determined by the voltage VTHD, i.e. time TS, and the dead time whose time duration is set by the voltage VTDEAD. VTHD is fixed and determined by the transformer characteristics, the parasitic inductance of the SR transistors, and the transition time in secondary controller 362 to guarantee enough SR current in the dead time to provide enough energy for ZVS in the primary. VTDEAD is dependent on the sampled and held current, so that the higher the sampled and held current, the less the dead time.

Thus, various embodiments of an LLC resonant power converter have been described. In one form, the LLC resonant power converter includes a synchronous rectifier (SR) controller and a primary side controller. The synchronous rectifier (SR) controller controls conduction times of a first SR transistor and a second SR transistor coupled to a secondary winding of a transformer in response to respective conduction conditions thereof. The primary side controller provides first and second primary phase signals for controlling first and second transistors. The primary side controller measures a first sense signal as a time between a gate voltage of the first SR transistor falling below a first threshold and an activation of the second primary phase signal, an adaptive dead time proportional to an average of current conducted in the first and second SR transistors during their respective active times, a first reference signal as a predetermined delay time plus the adaptive dead time, and a first error signal as an average difference between the first sense signal and the first reference signal, and controlling a switching speed of the first and second primary phase signals to reduce the first error signal.

The above-disclosed subject matter is to be considered illustrative, and not restrictive, and the appended claims are intended to cover all such modifications, enhancements, and other embodiments that fall within the true scope of the claims. For example, the SR controller and the primary side controller can be combined into a single integrated circuit, or could exist as separate integrated circuits. The LLC resonant power converter can be implemented using either a full-bridge or half-bridge architecture. A variety of known techniques can be used for zero current sensing of the SR transistors. Moreover, other circuits can be used to implement the adaptive dead-time circuit, the sense time determination circuit, and the reference time determination circuit other than the examples described above.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A DCX power converter comprising:
    a transformer having a primary winding and a secondary winding providing an output voltage;
    a primary side driver for alternately coupling said transformer to an input voltage terminal and a reference voltage terminal using first and second primary phase signals;
    first and second synchronous rectifier (SR) transistors each having a drain coupled to a respective one of first and second ends of said secondary winding; and
    a controller for deactivating respective ones of said first and second SR transistors when a respective drain current is less than a zero current detect threshold, for measuring a sense time between a voltage on a gate of said first SR transistor falling below a turn-on threshold and an activation of said second primary phase signal, an adaptive dead time proportional to an average of current conducted in said first and second SR transistors during their respective active times, a reference time as a predetermined delay time plus said adaptive dead time, and an error signal as an average difference between said sense time and said reference time, and for controlling a switching speed of said first and second primary phase signals to reduce said error signal.

2. The DCX power converter of claim 1, wherein the DCX power converter is an LLC resonant power converter having a resonant network coupled to said primary winding of said transformer, and said primary side driver is coupled to said primary winding and to said resonant network in a half-bridge configuration.

3. The DCX power converter of claim 1, wherein the DCX power converter is an LLC resonant power converter having a resonant network coupled to said primary winding of said transformer, and said primary side driver is coupled to said primary winding and to said resonant network in a full-bridge configuration.

4. The DCX power converter of claim 3, wherein said primary side driver comprises:
    a first transistor having a first source-drain terminal coupled to said input voltage terminal, a control electrode, and a second source-drain terminal coupled to a first terminal of said resonant network;
    a second transistor having a first source-drain terminal coupled to said second source-drain terminal of said first transistor, a control electrode, and a second source-drain terminal coupled to a reference voltage terminal; and
    a first driver having a first input for receiving said first primary phase signal, a second input for receiving said second primary phase signal, a first output coupled to said control electrode of said first transistor, and a second output coupled to said control electrode of said second transistor.

5. The DCX power converter of claim 4, wherein said primary side driver further comprises:
    a third transistor having a first source-drain terminal coupled to said input voltage terminal, a control electrode, and a second source-drain terminal coupled to a second terminal of said resonant network;
    a fourth transistor having a first source-drain terminal coupled to said second source-drain terminal of said third transistor, a control electrode, and a second source-drain terminal coupled to said reference voltage terminal; and
    a second driver having a first input for receiving said second primary phase signal, a second input for receiving said first primary phase signal, a first output coupled to said control electrode of said third transistor, and a second output coupled to said control electrode of said fourth transistor.

6. The DCX power converter of claim 5, wherein said resonant network comprises:
    an inductor having a first terminal forming said first terminal of said resonant network, and a second terminal coupled to a first end of said primary winding of said transformer; and
    a capacitor having a first terminal forming said second terminal of said resonant network, and a second terminal coupled to a second end of said primary winding of said transformer.

7. The DCX power converter of claim 1, wherein:
said secondary winding of said transformer has a center tap for providing said output voltage;
said drain of said first SR transistor is coupled to a first end of said secondary winding, and said first SR transistor further has a gate coupled to said controller, and a source coupled to a ground; and
said drain of said second SR transistor is coupled to a second end of said secondary winding, and said second SR transistor further has a gate coupled to said controller, and a source coupled to said ground.

8. A controller for a DCX power converter comprising:
a synchronous rectifier (SR) controller for controlling conduction times of a first SR transistor and a second SR transistor coupled to a secondary winding of a transformer in response to respective conduction conditions thereof; and
a primary side controller for providing first and second primary phase signals for controlling first and second transistors, said primary side controller measuring a first sense signal as a time between a gate voltage of said first SR transistor falling below a first threshold and an activation of said second primary phase signal, an adaptive dead time proportional to an average of current conducted in said first and second SR transistors during their respective active times, a first reference signal as a predetermined delay time plus said adaptive dead time, and a first error signal as an average difference between said first sense signal and said first reference signal, and controlling a switching speed of said first and second primary phase signals to reduce said first error signal.

9. The controller of claim 8, wherein said primary side controller comprises:
an adaptive dead time circuit coupled to said first and second SR transistors for providing said adaptive dead time.

10. The controller of claim 9, wherein said SR controller deactivates each of said first and second SR transistors in response to a respective drain current falling below a zero current detect threshold.

11. The controller of claim 10, wherein said adaptive dead time circuit adjusts said zero current detect threshold in response to said adaptive dead time.

12. The controller of claim 9, wherein said adaptive dead time circuit further provides first and second deactivation signals in response to respective gate voltages of said first and second SR transistors falling below a predetermined threshold.

13. The controller of claim 12, wherein said adaptive dead time circuit comprises:
a first sample-and-hold circuit having an input coupled to a drain of said first SR transistor, a first control input for receiving said gate voltage of said first SR transistor, a second control input for receiving a first sample signal, and an output;
a second sample-and-hold circuit having an input coupled to a drain of said second SR transistor, a first control input for receiving said gate voltage of said second SR transistor, a second control input for receiving a second sample signal, and an output; and
an averaging circuit for providing said adaptive dead time as an average of a voltage on said output of said first sample-and-hold circuit and a voltage on said output of said second sample-and-hold circuit.

14. The controller of claim 13, wherein said first sample-and-hold circuit generates said first sample signal said predetermined delay time after a start of an on period of said first SR transistor, and said second sample-and-hold circuit generates said second sample signal said predetermined delay time after a start of an on period of said second SR transistor.

15. The controller of claim 12, wherein said primary side controller comprises:
a first phase measurement circuit for measuring said first sense signal in response to said first primary phase signal and said first deactivation signal, and said first reference signal in response to said adaptive dead time and said first deactivation signal, and for providing said first error signal by integrating said first sense signal and said first reference signal;
a second phase measurement circuit for measuring a second sense signal in response to a second phase signal and said second deactivation signal, and a second reference signal in response to said adaptive dead time and said second deactivation signal, and for providing a second error signal by integrating said second sense signal and said second reference signal;
a voltage-controlled oscillator for providing a clock signal having an on time set by said first error signal and an off time set by said second error signal; and
a dead-time insertion circuit for providing said first and second primary phase signals in response to said clock signal and said adaptive dead time.

16. A method of controlling primary and secondary transistors of an LLC resonant power converter, comprising:
controlling conduction times of a first SR transistor and a second SR transistor coupled to a secondary winding of a transformer in response to respective conduction conditions thereof;
providing first and second primary phase signals for controlling first and second transistors, said providing comprising:
measuring a first sense signal as a time between a gate voltage of said first SR transistor falling below a first threshold and an activation of said second primary phase signal,
measuring an adaptive dead time proportional to an average current conducted in said first and second SR transistors during their respective active times;
measuring a first reference signal as a predetermined delay time plus said adaptive dead time;
measuring a first error signal as an average difference between said first sense signal and said first reference signal; and
controlling a switching speed of said first and second primary phase signals to reduce said first error signal.

17. The method of claim 16, wherein said controlling said conduction times of said first and second SR transistors comprises:
deactivating said first SR transistor when a respective drain current falls below a zero current detect threshold; and
deactivating said second SR transistor when a respective drain current falls below said zero current detect threshold.

18. The method of claim 16, wherein measuring said adaptive dead time comprises:
providing a first sample signal during an on time of said first SR transistor;
sampling a first current conducted in said first SR transistor in response to said first sample signal and providing a first sampled current in response;

providing a second sample signal during an on time of said second SR transistor;

sampling a second current conducted in said second SR transistor in response to said second sample signal and providing a second sampled current in response; and integrating said first and second sampled currents and proving said average current in response to said integrating.

19. The method of claim 18, wherein said providing further comprises:

said sampling said first current comprises sampling said first current a predetermined delay after a start of said on time of said first SR transistor; and said sampling said second current comprises sampling said second current said predetermined delay after a start of said on time of said second SR transistor.

20. The method of claim 18, further comprising:

measuring a second sense signal as a time between a gate voltage of said second SR transistor falling below a second threshold and an activation of said second primary phase signal, measuring a second reference signal as said predetermined delay time plus said adaptive dead time;

measuring a second error signal as an average difference between said second sense signal and said second reference signal; and controlling said switching speed of said first and second primary phase signals to reduce both said first error signal and said second error signal.

* * * * *